United States Patent
Chen et al.

(10) Patent No.: US 11,987,388 B2
(45) Date of Patent: May 21, 2024

(54) TENSIONING METHOD FOR TENSEGRITY KEEL

(71) Applicants: SHANGHAI JIAO TONG UNIVERSITY, Shanghai (CN); NEW UNITED GROUP CO., LTD., Changzhou (CN)

(72) Inventors: Wujun Chen, Shanghai (CN); Yibei Zhang, Shanghai (CN); Chengjun Gao, Shanghai (CN); Jianhui Hu, Shanghai (CN); Jiandong Xu, Changzhou (CN); Jing Liu, Changzhou (CN); Haijun Xiang, Changzhou (CN)

(73) Assignees: SHANGHAI JIAO TONG UNIVERSITY, Shanghai (CN); NEW UNITED GROUP CO., LTD., Changzhou (CN)

( * ) Notice: Subject to any disclaimer, the term of this patent is extended or adjusted under 35 U.S.C. 154(b) by 0 days.

(21) Appl. No.: 18/191,089

(22) Filed: Mar. 28, 2023

(65) Prior Publication Data
US 2023/0234721 A1 Jul. 27, 2023

Related U.S. Application Data (63) Continuation-in-part of application No. PCT/CN2021/097143, filed on May 31, 2021.

(30) Foreign Application Priority Data

Sep. 30, 2020 (CN) .......................... 202011061016.5

(51) Int. Cl.
*B64F 5/00* (2017.01)
(52) U.S. Cl.
CPC ...................................... *B64F 5/00* (2013.01)

(58) Field of Classification Search
CPC ..... B64F 5/00; B64F 5/10; B64B 1/08; G06F 30/15; G06F 30/20; G06F 2119/14
(Continued)

(56) References Cited

U.S. PATENT DOCUMENTS

2002/0096599 A1* 7/2002 McDermott .......... H01L 31/042
244/25
2007/0267537 A1* 11/2007 Nachbar ................... B64B 1/04
244/30

(Continued)

FOREIGN PATENT DOCUMENTS

CN 102622485 A 8/2012
CN 109969373 A 7/2019

(Continued)

OTHER PUBLICATIONS

English Machine Translation of CN112163277A (Year: 2021).*
International Search Report for PCT/CN2021/097143, mailed Aug. 16, 2021.

*Primary Examiner* — Sarang Afzali
*Assistant Examiner* — Darrell C Ford
(74) *Attorney, Agent, or Firm* — Andrus Intellectual Property Law, LLP (57) ABSTRACT

A tensioning method for a tensegrity keel is provided. The method includes the step of determining target values at an attainment of tensegrity. An outline of the integral keel is formed. A middle stiffening ring is tensioned through stretching a hub shaft, thereby attaining a self-equilibrium state. Telescopic rods are provided between stiffening rings and central trusses so that the stiffening rings and the central trusses are connected together. Longitudinal ties are mounted and constraints on bisection points and the central trusses are released and the integral keel is tensioned by stretching the telescopic rods, thereby introducing tension to the longitudinal ties. The lateral stiffening rings are ten- (Continued)

sioned by stretching the hub shaft, thereby attaining a self-equilibrium state. Adjustments are made using iterative methods so that target values at the attainment of tensegrity will be reached.

16 Claims, 6 Drawing Sheets

(58) Field of Classification Search
USPC .......................................... 29/897.2
See application file for complete search history.

(56) References Cited

U.S. PATENT DOCUMENTS

| 2017/0021907 A1* | 1/2017 | Rapport ................... B64B 1/14 |
| 2022/0187177 A1 | 6/2022 | Chen et al. |

FOREIGN PATENT DOCUMENTS

| CN | 110015396 A | 7/2019 |
| CN | 110395409 A | 11/2019 |
| CN | 110705024 A | 1/2020 |
| CN | 112163277 A | 1/2021 |

* cited by examiner

TENSIONING METHOD FOR TENSEGRITY KEEL

RELATED APPLICATIONS

This application is a continuation-in-part (CIP) application claiming benefit of PCT/CN2021/097143 filed on May 21, 2021, which claims priority to Chinese Patent Application No. 202011061016.5 filed on Sep. 30, 2020, the disclosures of which are incorporated herein in their entirety by reference.

FIELD OF THE INVENTION

This application relates to the field of analysis technology for design optimization of engineering structures and, in particular, to a tensioning method for a tensegrity keel.

DESCRIPTION OF THE PRIOR ART

A tensegrity keel is primarily composed of stiffening rings, central trusses and longitudinal ties. The stiffening rings are tensioned in a self-equilibrium state by radial spokes. Telescopic rods between the central truss and the stiffening rings are stretched to cause large tensile stresses on the longitudinal ties and large compressive stresses on the central truss, which bring the keel into a self-equilibrium state with great rigidity. Such a structure can serve as a supporting skeleton for a large spatial structure and has the advantages of, inter alia, fewer constituent members, high rigidity, a stable equilibrium state.

A tensegrity keel is required to be designed with a determined final shape and tensile state. How to achieve precise loading control of its final shape and tensile state through reasonable loading is a central topic in the research of tensioning strategies for "tensegrity keels". This involves two aspects: 1) how to design a reasonable loading method; and 2) how to achieve precise loading control of a final shape and a final tensile state and tensile state for a tensegrity keel.

In "Large-Scale Semi-Rigid Structure Airship" (Patent Application No. 201910275705.7) by Wujun Chen, Gongyi Fu, Xiaoliang Wang, et al., there is proposed a semi-rigid airship with a keel composed of stiffening rings and longitudinal ties serving as a main support structure thereof. Moreover, in "Strut Contact Type Tensegrity Structure and Methods for Integration and Tension Application thereof" (Patent Application No. 201910275699.5) by Wujun Chen, Jianhui Hu, Bing Zhao, et al., there are proposed a particular "stiffening ring" and tensioning method for an integral keel. However, precise loading control of a final shape and tensile state of a tensegrity keel is still not made explicit.

Therefore, those skilled in the art are directing their effort toward developing a tensioning method for a tensegrity keel, which is capable of precise loading control of a final shape and tensile state of the tensegrity keel.

SUMMARY OF THE INVENTION

In view of the above described shortcomings of the prior art, the problem sought to be solved by the present invention lies in how to achieve precise loading control of a final shape and tensile state of the tensegrity keel.

In order to solve the above problem, a tensioning method for a tensegrity keel is described herein, which specifically includes the steps as follows.

Step 1: Determine target values at an attainment of tensegrity. The target values include a target tensile force value for longitudinal ties, first final coordinates for bisection points, a second final coordinate for a first end and a third final coordinate for a second end at the attainment of tensegrity;

Step 2: Successively place a plurality of stiffening rings and a plurality of central trusses to form an outline of the keel and fix bisection points of the individual stiffening rings;

Step 3: Secondarily tension a first stiffening ring, thereby attaining a self-equilibrium state;

Step 4: Provide telescopic rods between the stiffening rings and the central trusses so that the stiffening rings and the central trusses are connected together.

Step 5: Mount the longitudinal ties;

Step 6: Release constraints on the bisection points and the central trusses and tension the keel, thereby introducing tension to the longitudinal ties so that tensile forces on the longitudinal ties at the attainment of tensegrity will reach the target tensile force value;

Step 7: Secondarily tension the other stiffening rings than the first stiffening ring, thereby attaining a self-equilibrium state;

Step 8: Adjust initial position coordinates of the bisection points, the first end and the second end so that the bisection points will reach the first final coordinates, the first end will reach the second final coordinate and the second end will reach the third final coordinate, at the attainment of tensegrity.

Optionally, in Step 3, the first stiffening ring is secondarily tensioned by stretching a hub shaft.

Optionally, in Step 5, the longitudinal ties are mounted by attachment following stretching or compression of them.

Optionally, in Step 5, the longitudinal ties are successively mounted in order from the middle to both ends.

Optionally, in Step 5, the longitudinal ties are mounted in symmetry.

Optionally, in Step 5, a length of the longitudinal ties when they are not under stress is adjusted using a first iterative method so that the stiffening rings will not skew when a final shape is formed by tensioning.

Optionally, the first iterative method includes: determining coordinates of first chords in the stiffening rings; determining coordinates of second chords in the stiffening rings; determining average position coordinates of the first chords and the second chords; and adjusting the length of the longitudinal ties when they are not under stress so that differences between the average position coordinates and the first final coordinates are less than a predetermined value; and then stopping iteration.

Optionally, in Step 6, the keel is tensioned by stretching the telescopic rods.

Optionally, in Step 6, the telescopic rods are stretched by raising a temperature.

Optionally, in Step 6, a temperature load on the telescopic rods is adjusted using a second iterative method.

Optionally, the second iterative method includes: determining tensile forces on the longitudinal ties; adjusting the temperature load on the telescopic rods so that differences between the tensile forces on the longitudinal ties and the target tensile force value are less than a predetermined value; and then stopping iteration.

Optionally, in Step 8, initial position coordinates of the bisection points, the first end and the second end are adjusted using a third iterative method.

Optionally, the third iterative method includes: determining position coordinates of the bisection points at the attainment of tensegrity; and adjusting the initial position coordinates of the bisection points so that differences between the position coordinates of the bisection points at the attainment of tensegrity and the first final coordinates are less than a predetermined value.

Optionally, the third iterative method includes: determining a position coordinate of the first end at the attainment of tensegrity; and adjusting the initial position coordinate of the first end so that a difference between the position coordinate of the first end at the attainment of tensegrity and the second final coordinate is less than a predetermined value.

Optionally, the third iterative method includes: determining a position coordinate of the second end at the attainment of tensegrity; and adjusting the initial position coordinate of the second end so that a difference between the position coordinate of the second end at the attainment of tensegrity and the third final coordinate is less than a predetermined value.

Optionally, the longitudinal ties are tension members, which are linearly elastic when tensioned.

Optionally, the longitudinal ties are made of carbon fibers.

Optionally, the central trusses are thin-walled tubular compression members.

Optionally, the central trusses are made of a material, which is linearly elastic when compressed.

Optionally, it is necessary to take geometric nonlinearity and stability into account when calculating lengths of compression of the central trusses.

Optionally, the central trusses are made of carbon fibers.

The tensioning method proposed in this application has at least the following benefits:

1. It enables precise loading control of a final shape and a tensile state of a tensegrity keel.
2. By iteration optimization, calculation processes are optimized to be clear and concise. Each iteration process is performed to adjust only a single variable. Therefore, this optimization approach allows for good convergence without easy divergence.

Below, the concept, structural details and resulting technical effects of the present application will be further described with reference to the accompanying drawings to provide a full understanding of the objects, features and effects of the invention.

BRIEF DESCRIPTION OF THE DRAWING

FIG. 8 depicts a flowchart of a third iterative method according to one embodiment of this application, in which, 1 denotes a stiffening ring; 101, a radial spoke; 102, a bisection point; 103, a hub shaft; 104, a telescopic rod; 105, a first chord; 106, a third chord; 107, a second chord; 2, a longitudinal tie; 201, a longitudinal tie; 202, a longitudinal tie; 203, a longitudinal tie; 204, a longitudinal tie; 205, a longitudinal tie; 206, a longitudinal tie; 207, a longitudinal tie; 208, a longitudinal tie; 3, a central truss; 4, a first end; and 5, a second end.

DETAILED DESCRIPTION OF THE PREFERRED EMBODIMENTS

Below, the accompanying drawings of this specification are referenced to introduce many preferred embodiments of the present application so that the techniques thereof become more apparent and readily understood. This application may be embodied in many different forms of embodiment, and the protection scope of the application is not limited only to the embodiments mentioned herein.

Throughout the accompanying drawings, structurally identical parts are indicated with identical reference numerals, and structurally or functionally similar components are indicated with similar reference numerals. The size and thickness of each component in the drawings are arbitrarily depicted, and the present application is not limited to any size or thickness of each component. For greater clarity of illustration, the thicknesses of some parts are exaggerated as appropriate somewhere in the drawings.

Figure 1:
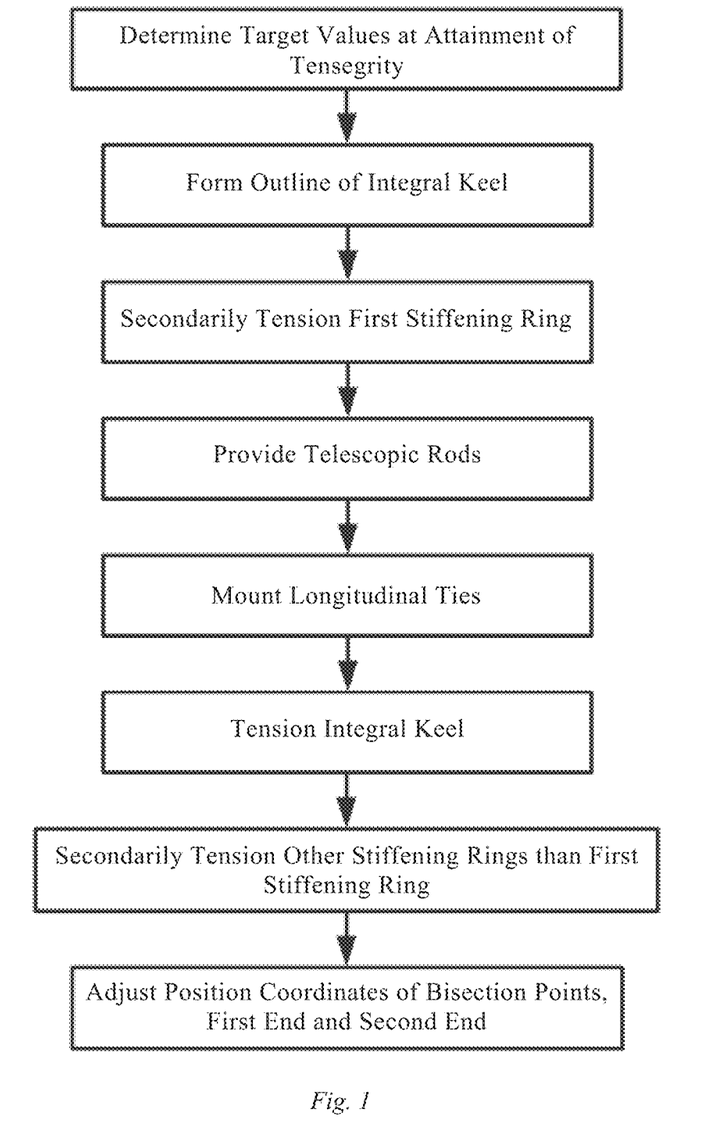
FIG. 1 depicts a flowchart of a tensioning method of for a tensegrity keel according to one embodiment of this application.

FIG. 1 shows a computational process for overall optimization in a tensioning strategy for a tensegrity keel and a method of analysis for optimization thereof according to a preferred embodiment of this application, which includes the steps as follows:

Step 1: According to engineering requirements, determine target values at the attainment of tensegrity. The determination includes determining target tensile force value Fz_opt for longitudinal ties 2 and target final coordinate values Cf_opt for bisection points 102, a first end 4 and a second end 5.

Figure 2:
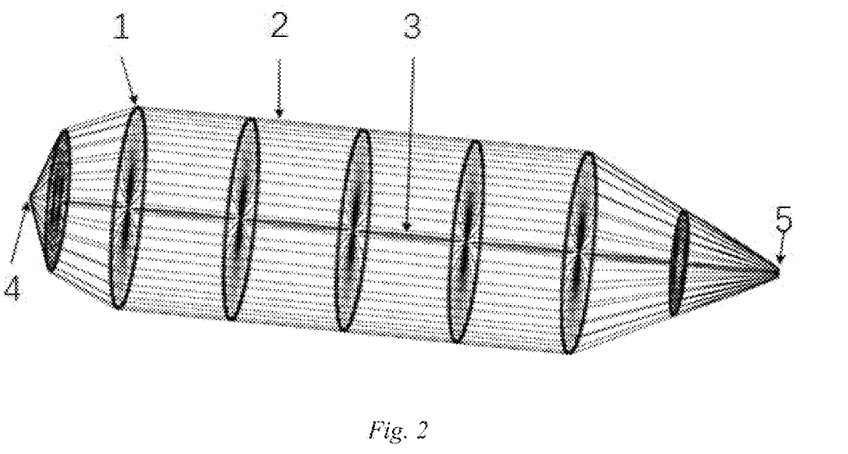
FIG. 2 is a schematic diagram depicting the structure of a tensegrity keel according to one embodiment of this application.
Figure 3:
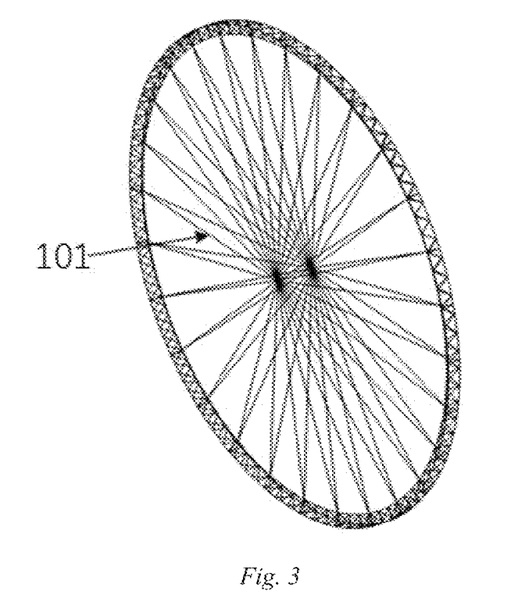
FIG. 3 is a schematic diagram depicting the structure of a stiffening ring according to one embodiment of this application.
Figure 4:
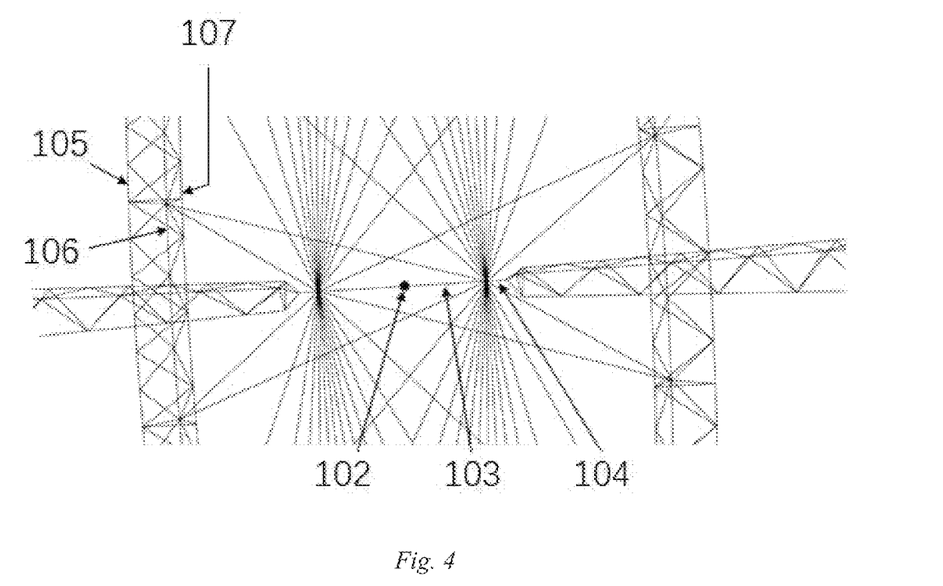
FIG. 4 is a detailed schematic diagram depicting the structure of a stiffening ring according to one embodiment of this application.

Step 2: Successively place stiffening rings 1 with pretensioned radial spokes 101 (see FIG. 3) and central trusses 3 to form an outline of the keel (see FIG. 2), fix bisection points 102 of the stiffening rings 1 and the central trusses 3, and record coordinate values of the bisection points 102, the first end 4 and the second end 5 as initial values Cf0. The stiffening rings include a middle stiffening ring and lateral stiffening rings (see FIG. 4).

Step 3: Secondarily tension the middle stiffening ring 1 (referred to as the first stiffening ring hereinafter) by stretching a hub shaft 103, thereby attaining a self-equilibrium state (see FIG. 4).

Step 4: Provide telescopic rods 104 between the stiffening rings 1 and the central trusses 3, which couple the stiffening rings 1 and the central trusses 3 together.

Figure 5:
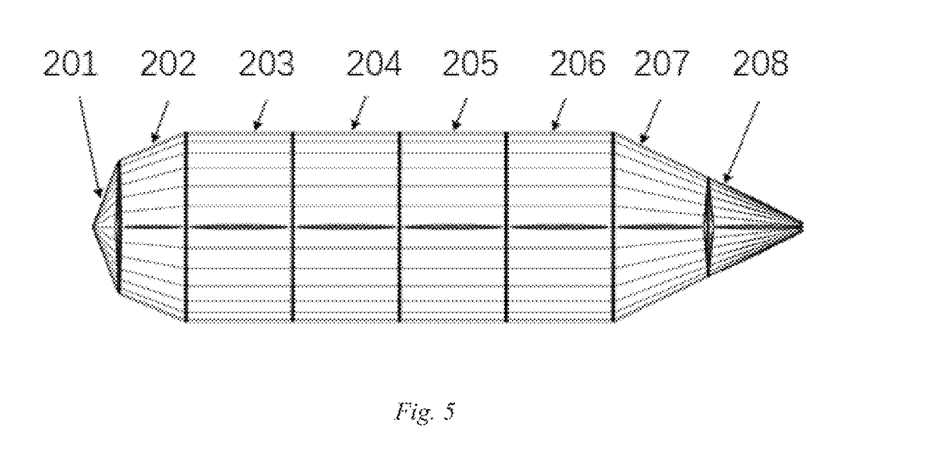
FIG. 5 is a schematic depiction of longitudinal ties according to one embodiment of this application.

Step 5: Mount longitudinal ties 2 through attachment following stretching or compression of them successively in order from the middle to both ends so that they are in left-right symmetry. As shown in FIG. 5, the longitudinal ties are successively mounted in the order: 204, 205, 203, 206, 202, 207, 201, 208. It is intended that an initial length Lz0 of the longitudinal ties 2 when they are not under stress is so optimized that, after the keel is tensioned to assume a final shape, the stiffening rings 1 substantially do not skew.

A difference between an average transverse coordinate Cxi_avg of a left chord 105 and a right chord 107 in an i-th one of the stiffening rings and the coordinate Cfi of the bisection point 102 of the specific stiffening ring at the attainment of tensegrity are chosen as a descriptor indicating whether the stiffening rings are skewing. The average transverse coordinate Cxi_avg of the left chord 105 and the right chord 107 in the i-th stiffening ring may be expressed as $$C_{xi\_avg} = \frac{(C_{xi\_1} + C_{xi\_2})}{2} \quad (1)$$

where $C_{xi\_1}$ is a transverse coordinate of the left chord 105 in the i-th stiffening ring, and $C_{xi\_2}$ is a transverse coordinate of the right chord 107 in the i-th stiffening ring.

Figure 6:
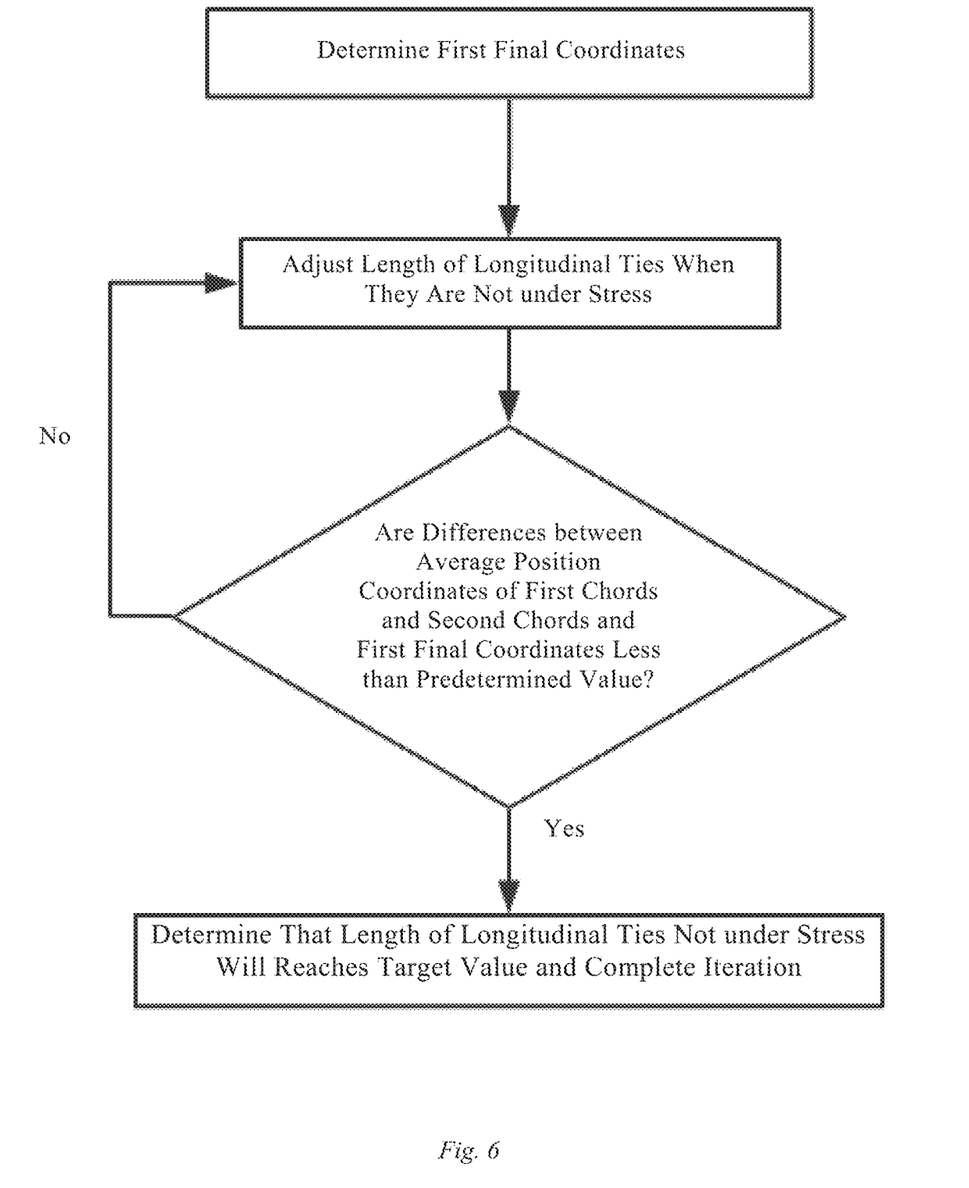
FIG. 6 depicts a flowchart of a first iterative method according to one embodiment of this application.

As shown in FIG. 6, the initial length Lz0 of the longitudinal ties 2 when they are not under stress is adjusted using a first iterative method so that the stiffening rings substantially do not skew after the tensioning is completed. That is, for any i-th one of the stiffening rings, it is intended that the average transverse coordinate Cxi_avg of the left chord 105 and the right chord 107 is substantially the same as the coordinate Cfi of the corresponding bisection point 102. When Cxi_avg and Cfi satisfy formula (2), the optimizing iteration is stopped, and, at this time, the stiffening rings 1 are considered as not skewing and that the initial length Lz0 of the longitudinal ties 2 when they are not under stress satisfies the design requirements. Formula (2) is shown below:

$$|C_{x\_avg} - C_{fi}| < \varepsilon_1 \quad (2)$$

where $\varepsilon_1$ is a small quantity determined according to the engineering requirements.

Step 6: Release constraints on the bisection points 102 and the central trusses 3 and tension the keel through stretching the telescopic rods 104 to apply tension to the longitudinal ties 2. Amounts of stretching of the telescopic rods 104 are denoted as LS, and a tensile force on an i-th set of the longitudinal ties after the keel is tensioned to assume the final shape is denoted as Fzi.

The telescopic rods 104 may be stretched by raising a temperature in a calculation performed in structural analysis software. To this end, a temperature load TS is applied to the telescopic rods 104, which enables tensile forces on the individual longitudinal ties 2 to reach the respective target values after the keel is tensioned to assume the final shape.

Figure 7:
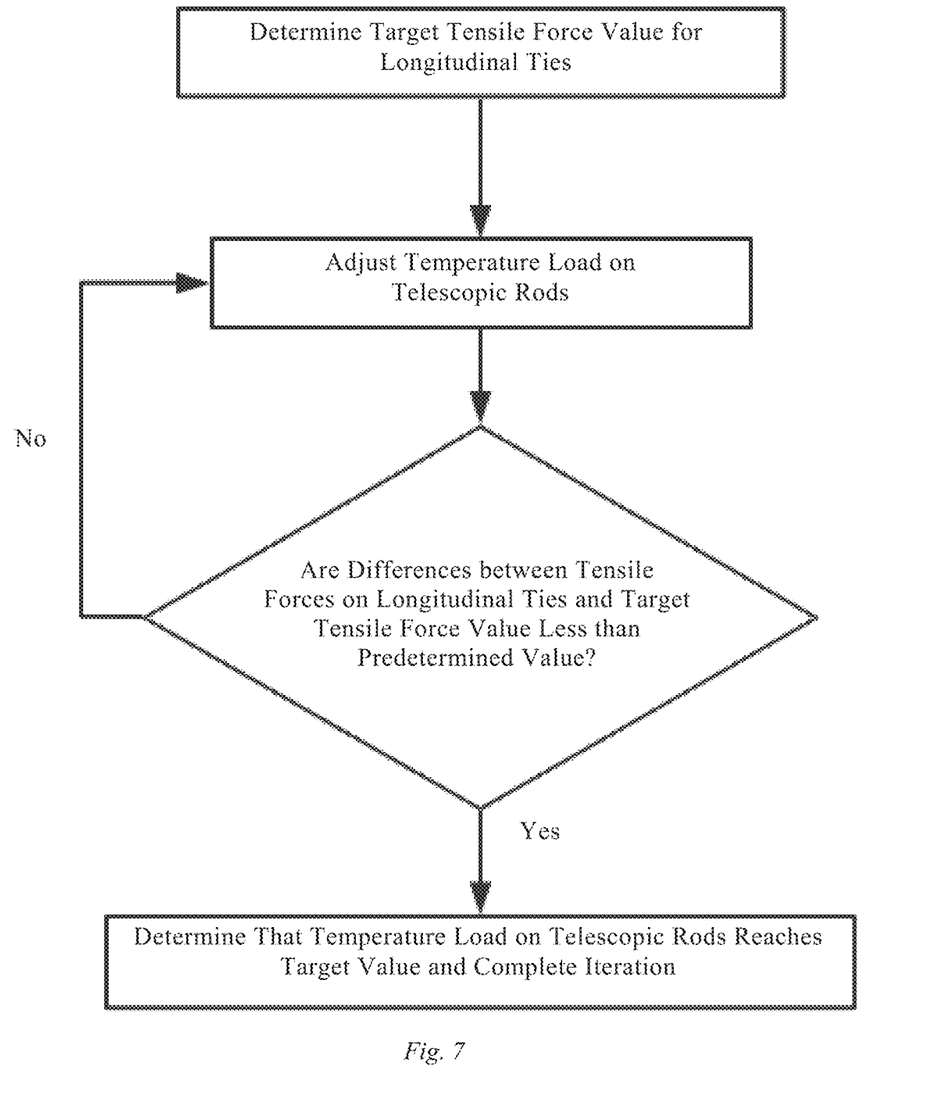
FIG. 7 depicts a flowchart of a second iterative method according to one embodiment of this application.

As shown in FIG. 7, the temperature load TS on the telescopic rods 104 is adjusted using a second iterative method. When an average value mean ($F_{zi}$) of the tensile forces Fzi on any i-th set of the longitudinal ties 2 at the attainment of tensegrity and a corresponding one of the target values Fzi_opt satisfy formula (3), or (4) in some other embodiments, the optimizing iteration is stopped and, at this time, the temperature load TS on the telescopic rods 104 is considered as meeting the design requirements.

$$\frac{|\text{mean}(F_{zi}) - F_{zi\_opt}|}{F_{zi\_opt}} < \varepsilon_2 \quad (3)$$

$$|\text{mean}(F_{zi}) - F_{zi\_opt}| < \varepsilon_2 \quad (4)$$

where $\varepsilon_2$ is a small quantity determined according to the engineering requirements.

Step 7: Secondarily tension the other lateral stiffening rings 1 than the first stiffening ring by stretching the hub shaft, thereby attaining a self-equilibrium state.

Step 8: Due to coordinate shifts of the bisection points 102, the first end 4 and the second end 5 as a result of the stretching of the telescopic rods 104 in Step 6, at the attainment of tensegrity, the keel will have a different transverse dimension (the difference between the coordinates of the second end 5 and the first end 4) and different positions of the individual stiffening rings than the initial values.

Figure 8:
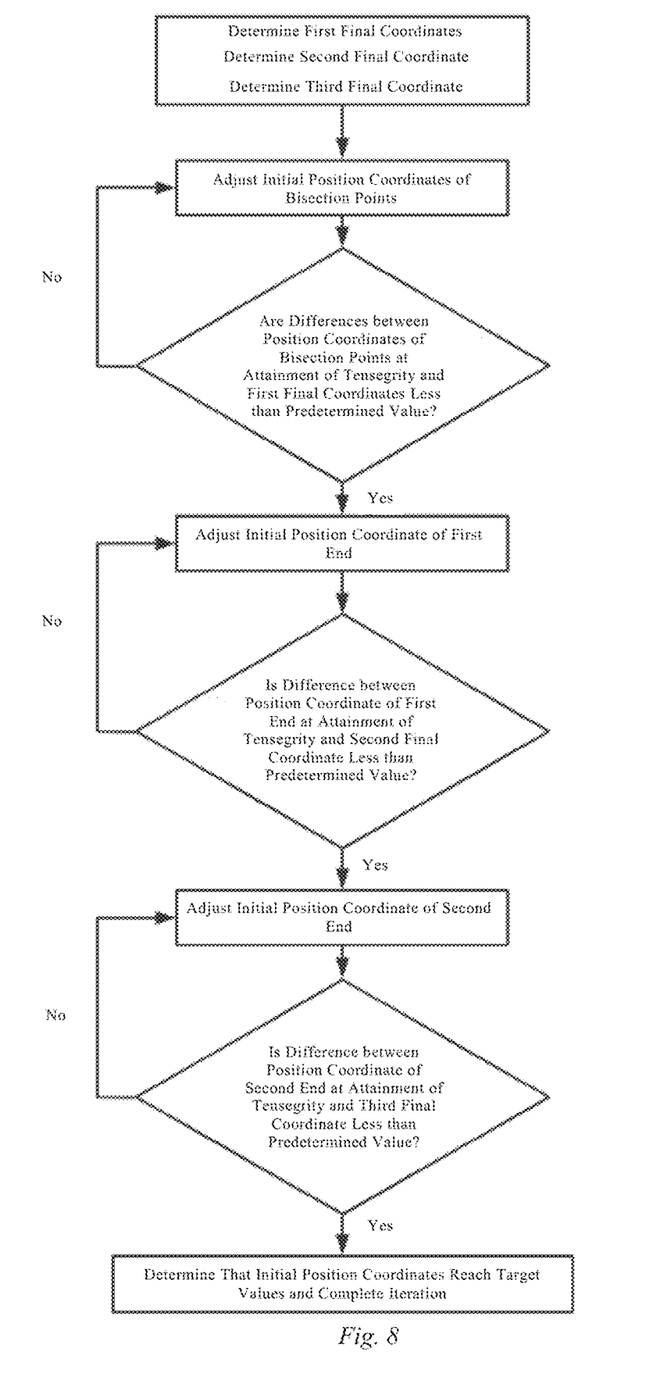

The initial coordinates Cf0 of the bisection points 102, the first end 4 and the second end 5 are adjusted using a third iterative method so that their coordinate values Cf at the attainment of tensegrity reach the target values. When Cf and the target values Cf_opt satisfy formula (5), the optimizing iteration is stopped and, at this time, the initial coordinates Cf0 of the bisection points 102, the first end 4 and the second end 5 satisfy the design requirements.

$$|C_{f\_opt} - C_f| < \varepsilon_3 \quad (5)$$

where $\varepsilon_3$ is a small quantity determined according to the engineering requirements.

The secondary tensioning of the lateral stiffening rings 1 must precede the tensioning of the longitudinal ties 2 (i.e., the stretching of the telescopic rods 104). Tensioning the longitudinal ties 2 after the lateral stiffening rings 1 are secondarily tensioned tends to lead to slackening of the radial spokes 101 of the lateral stiffening rings 1.

The radial spokes 101 and the longitudinal ties 2 are tension members made of high-strength, high-rigidity, lightweight carbon fibers, which are linearly elastic when tensioned. It is not necessary to consider nonlinearity and strength degradation of the material.

The central trusses are thin-walled tubular compression members made of high-strength, high-rigidity, lightweight carbon fibers, which are linearly elastic when compressed, allowing calculation of their lengths of compression. It is necessary to take their geometric nonlinearity and stability into account.

Stressing and deformation conditions of the structures may be calculated through numerical analysis performed by structural analysis software.

Stability analysis for the compression members may be accomplished by numerical nonlinear stability analysis performed by structural analysis software.

According to this application, the target tensile force value Fz_opt for the longitudinal ties 2 and the target final coordinate values Cf_opt for the bisection points 102, the first end 4 and the second end 5 at the attainment of tensegrity may be specifically determined for a particular engineering application.

Preferred specific embodiments have been described in detail above. It is to be understood that, those of ordinary skill in the art, without the need for creative effort, can make various modifications and changes, based on the concept of the present invention. Accordingly, all the technical solutions that can be obtained by those skilled in the art by logical analysis, inference or limited experimentation in accordance with the concept of the invention on the basis of the prior art are intended to fall within the protection scope as defined by the claims.

The invention claimed is:

1. A tensioning method for a tensegrity keel, comprising the steps of:
   step 1: determining target values at an attainment of tensegrity, the target values including target tensile force values for longitudinal ties, first final coordinates for bisection points, a second final coordinate for a first end and a third final coordinate for a second end at the attainment of tensegrity;

step 2: successively placing a plurality of stiffening rings and a plurality of central trusses to form an outline of the keel and fixing bisection points of the individual stiffening rings, wherein each of the plurality of stiffening rings is provided with pre-tensioned radial spokes;

step 3: tensioning a first stiffening ring of the plurality of stiffening rings by stretching a first hub shaft, thereby attaining a self-equilibrium state;

step 4: providing telescopic rods between each of the plurality of stiffening rings and adjacent central trusses of the plurality of central trusses thereof so that the plurality of stiffening rings and the plurality of central trusses are connected together;

step 5: mounting the longitudinal ties by attachment following stretching or compression of the longitudinal ties, wherein the longitudinal ties are successively mounted in order from a middle to both ends, and the longitudinal ties are mounted in symmetry, so that the keel is formed;

step 6: releasing constraints on the bisection points and the central trusses and tensioning the keel through stretching the telescopic rods, thereby introducing tension to the longitudinal ties so that tensile forces on the longitudinal ties at the attainment of tensegrity will reach the target tensile force value;

step 7: tensioning the other stiffening rings than the first stiffening ring of the plurality of stiffening rings, thereby attaining a self-equilibrium state; and step 8: adjusting initial position coordinates of the bisection points, the first end and the second end so that the bisection points will reach the first final coordinates, the first end will reach the second final coordinate and the second end will reach the third final coordinate, at the attainment of tensegrity.

2. The tensioning method of claim 1, wherein in the step 5, an initial length of the longitudinal ties when they are not under stress is adjusted using a first iterative method so that the stiffening rings will not skew when a final shape is formed by tensioning.

3. The tensioning method of claim 2, wherein the first iterative method comprises: determining coordinates of first chords in the stiffening rings; determining coordinates of second chords in the stiffening rings; determining average position coordinates of the first chords and the second chords; and adjusting a length of the longitudinal ties when they are not under stress so that differences between the average position coordinates and the first final coordinates are less than a predetermined value, and then stopping iteration.

4. The tensioning method of claim 3, wherein in the step 6, the keel is tensioned by stretching the telescopic rods.

5. The tensioning method of claim 4, wherein in the step 6, the telescopic rods are stretched by raising a temperature.

6. The tensioning method of claim 5, wherein in the step 6, a temperature load on the telescopic rods is adjusted using a second iterative method.

7. The tensioning method of claim 6, wherein the second iterative method comprises: determining tensile forces on the longitudinal ties; adjusting the temperature load on the telescopic rods so that differences between the tensile forces on the longitudinal ties and the target tensile force value are less than a predetermined value, and then stopping iteration.

8. The tensioning method of claim 7, wherein in the step 8, initial position coordinates of the bisection points, the first end and the second end are adjusted using a third iterative method.

9. The tensioning method of claim 8, wherein the third iterative method comprises: determining position coordinates of the bisection points at the attainment of tensegrity; and adjusting the initial position coordinates of the bisection points so that differences between the position coordinates of the bisection points at the attainment of tensegrity and the first final coordinates are less than a predetermined value.

10. The tensioning method of claim 9, wherein the third iterative method comprises: determining a position coordinate of the first end at the attainment of tensegrity; and adjusting the initial position coordinate of the first end so that a difference between the position coordinate of the first end at the attainment of tensegrity and the second final coordinate is less than a predetermined value.

11. The tensioning method of claim 10, wherein the third iterative method comprises: determining a position coordinate of the second end at the attainment of tensegrity; and adjusting the initial position coordinate of the second end so that a difference between the position coordinate of the second end at the attainment of tensegrity and the third final coordinate is less than a predetermined value.

12. The tensioning method of claim 11, wherein the longitudinal ties are tension members, which are linearly elastic when tensioned.

13. The tensioning method of claim 12, wherein the longitudinal ties are made of carbon fibers.

14. The tensioning method of claim 13, wherein the central trusses are thin-walled tubular compression members.

15. The tensioning method of claim 14, wherein the central trusses are linearly elastic when compressed.

16. The tensioning method of claim 14, wherein the central trusses are made of carbon fibers.

* * * * *